(12) United States Patent
Viljoen

(10) Patent No.: US 7,685,474 B2
(45) Date of Patent: Mar. 23, 2010

(54) FAILSAFE COMPUTER SUPPORT ASSISTANT USING A SUPPORT VIRTUAL MACHINE

(75) Inventor: Pieter Viljoen, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 389 days.

(21) Appl. No.: 11/687,424

(22) Filed: Mar. 16, 2007

(65) Prior Publication Data
US 2008/0229159 A1    Sep. 18, 2008

(51) Int. Cl.
*G06F 11/00*    (2006.01)
*G06F 9/54*    (2006.01)

(52) U.S. Cl. .............. 714/46; 714/38; 714/40; 718/100; 718/104

(58) Field of Classification Search ............ 714/1, 714/38, 40, 46; 718/1, 100, 104
See application file for complete search history.

(56) References Cited

U.S. PATENT DOCUMENTS

| | | | |
|---|---|---|---|
| 6,223,202 B1 * | 4/2001 | Bayeh ................ 718/102 |
| 6,363,478 B1 * | 3/2002 | Lambert et al. ......... 713/151 |
| 6,763,458 B1 | 7/2004 | Watanabe et al. |
| 7,111,200 B2 * | 9/2006 | Armstrong et al. ........ 714/34 |
| 7,231,549 B1 * | 6/2007 | Rhea et al. .............. 714/25 |
| 7,530,071 B2 * | 5/2009 | Billau et al. ............ 718/104 |
| 7,574,627 B2 * | 8/2009 | Ogasawara et al. ........ 714/38 |
| 2001/0025371 A1 | 9/2001 | Sato et al. |
| 2005/0081212 A1 * | 4/2005 | Goud et al. ............. 718/107 |
| 2005/0228769 A1 * | 10/2005 | Oshima et al. ........... 707/1 |
| 2006/0021041 A1 | 1/2006 | Challener et al. |
| 2007/0192765 A1 * | 8/2007 | Shimogawa et al. ....... 718/1 |
| 2008/0163239 A1 * | 7/2008 | Sugumar et al. ......... 718/105 |

OTHER PUBLICATIONS

European Search Report and Search Opinion, European Patent Application No. 08250889.6, May 28, 2008, 7 pages.
German Office Action, German Application No. 10 2008 013 033.8, Jul. 8, 2009, 4 pages.

* cited by examiner

*Primary Examiner*—Scott T Baderman
*Assistant Examiner*—Joseph Schell
(74) *Attorney, Agent, or Firm*—Fenwick & West LLP

(57) ABSTRACT

A computer running a host operating system in a host virtual machine includes a support operating system running in a support virtual machine. A support module running in the support operating system identifies and remediates defects associated with the host operating system. A monitoring module running in the support operating system identifies a defect associated with the host operating system and notifies the support module responsive to identification of the defect. A user interface is provided for the support module. The user interface can be through a web server or a support button associated with an input device of the computer. The user interface can be supported through input/output virtualization hardware of the computer. A host agent module executing in the host operating system can interact with the support module to remediate a defect associated with the host operating system.

16 Claims, 3 Drawing Sheets

FAILSAFE COMPUTER SUPPORT ASSISTANT USING A SUPPORT VIRTUAL MACHINE

BACKGROUND

1. Field of the Invention

This invention pertains in general to providing support to a computer user.

2. Description of the Related Art

A support assistant can provide integrated and comprehensive assistance to a computer user, and may be relied upon by the user to learn how to use the computer or to fix the computer, including software, if a problem arises. A support assistant generally includes support software running on the computer and possibly external components, such as a live help center staffed with support technicians that communicates with the user over the Internet through the support software.

The computer support software performs a variety of useful tasks. It can perform diagnostic tests to determine if the hardware and software of the computer is functioning correctly. Support software can repair damaged software. Support software can provide help screens or otherwise assist a user to perform various tasks. Such assistance may be provided over the Internet, for example. Support software can also include utilities, such as file backup software or system configuration software.

Typically, the support software runs on the user's computer under the same operating system used by the user. As a result, if the operating system or some application on the operating system is having a problem, the support software may not be able to run properly. Therefore, there is a need in the art for a support assistant with support software that can run when the operating system or applications are malfunctioning.

BRIEF SUMMARY OF THE INVENTION

The above need is met by a support module running in a support operating system that identifies and remediates defects associated with a host operating system.

A computer having a processor capable of executing multiple virtual machines and running a host operating system in a host virtual machine includes a support operating system running in a support virtual machine that is different than the host virtual machine. A support module running in the support operating system identifies and remediates defects associated with the host operating system. A monitoring module running in the support operating system identifies a defect associated with the host operating system and notifies the support module responsive to identification of the defect.

A user interface is provided for the support module. The user interface can be through a web server module running in the support operating system or through a support button associated with an input device of the computer. The user interface can be supported through input/output virtualization hardware of the computer.

A host agent module executing in the host operating system can interact with the support module to remediate a defect associated with the host operating system.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
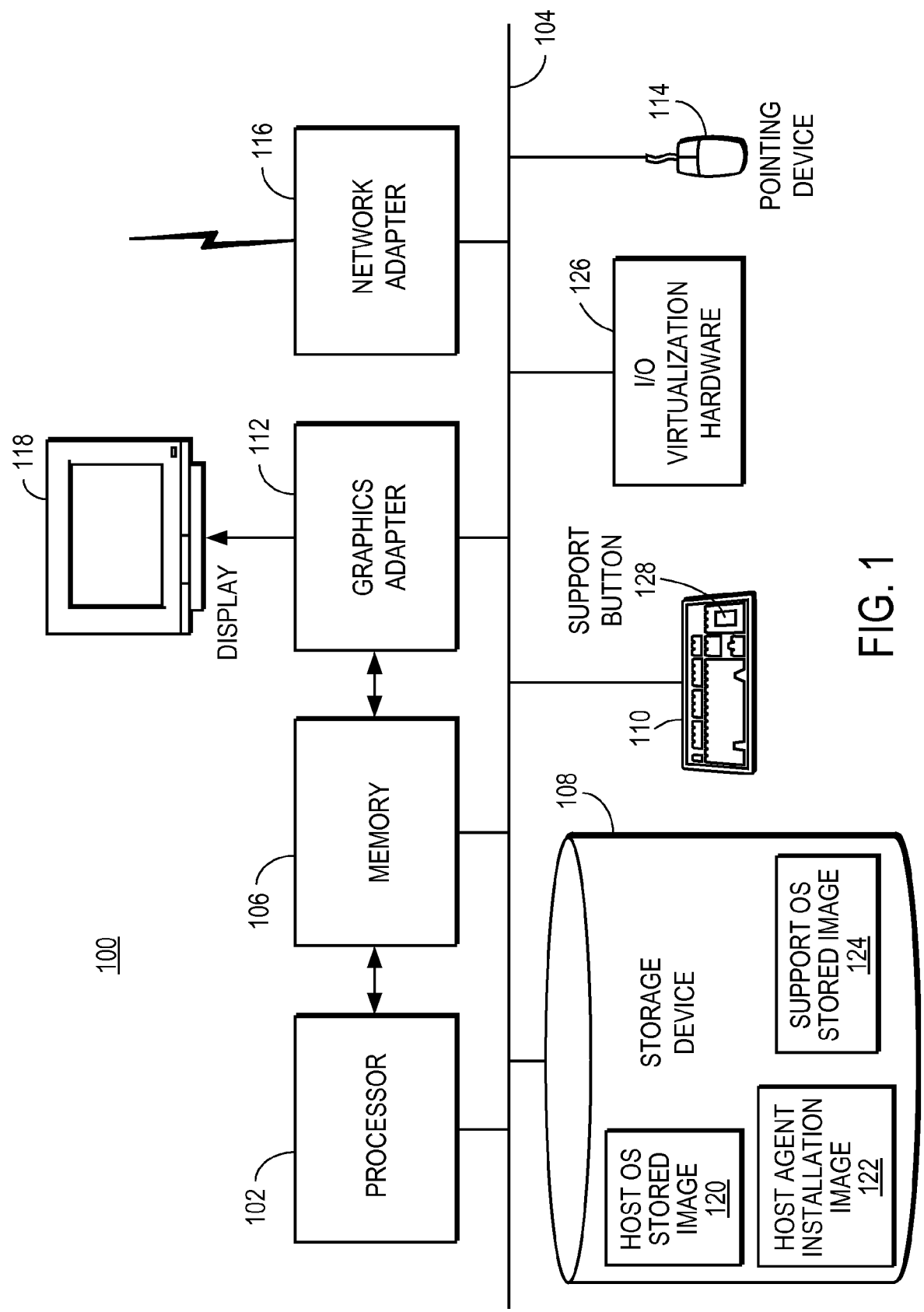
FIG. 1 is a high-level block diagram illustrating a computer running a failsafe computer support assistant according to one embodiment.

FIG. 1 is a high-level block diagram illustrating a computer 100 running a failsafe computer support assistant according to one embodiment. Illustrated are at least one processor 102 coupled to a bus 104. The processor 102 includes virtualization technology allowing it to support one or more virtual machines. Examples of processor virtualization technologies are Intel Virtualization Technology (IVT) and AMD Virtualization (AMD-V) for x86 processor architectures.

Also coupled to the bus 104 are a memory 106, a storage device 108, a keyboard 110, a graphics adapter 112, a pointing device 114, and a network adapter 116. A display 118 is coupled to the graphics adapter 112. The keyboard 110 can include a specially provided support button 128 for the user to press to launch the computer support software. A switch may also be used, and this button or switch can also be located elsewhere on computer 100. The storage device 108 is a device such as a hard drive, CD or DVD drive, or flash memory device, and holds files containing executable code and/or data utilized during the operation of the computer 100. The host operating system stored image 120, the host agent installation image 122, and the support operating system stored image 124 are three such files, described below. The memory 106, in one embodiment, is a random access memory (RAM) and holds instructions and data loaded from the storage device 108, generated during processing, and/or from other sources.

In one embodiment, Input/Output (I/O) virtualization hardware 126 is also coupled to the bus 104. This hardware enables the virtualization of input and output devices such as graphics adapter 112, keyboard 110, and pointing device 114. With I/O virtualization, access to these devices can be coordinated between multiple virtual machines and operating systems running on processor 102, as described below.

Computers acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

The computer 100 executes one or more operating systems such as a variant of MICROSOFT WINDOWS or LINUX. In general, an operating system executes one or more application programs. The operating systems and application programs executed by the computer are formed of one or more processes. This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

The host operating system (host OS) stored image 120, host agent installation image 122, and the support operating (support OS) system stored image 124 are three modules stored on the storage device 108 that are loaded and executed by the processor 102. Software to support a user working in the host OS is distributed between the support OS and the host agent (running in the host OS). By placing certain support software in the support OS, the support assistant can continue to function even if the host OS is seriously impaired or unstable.

Figure 2:
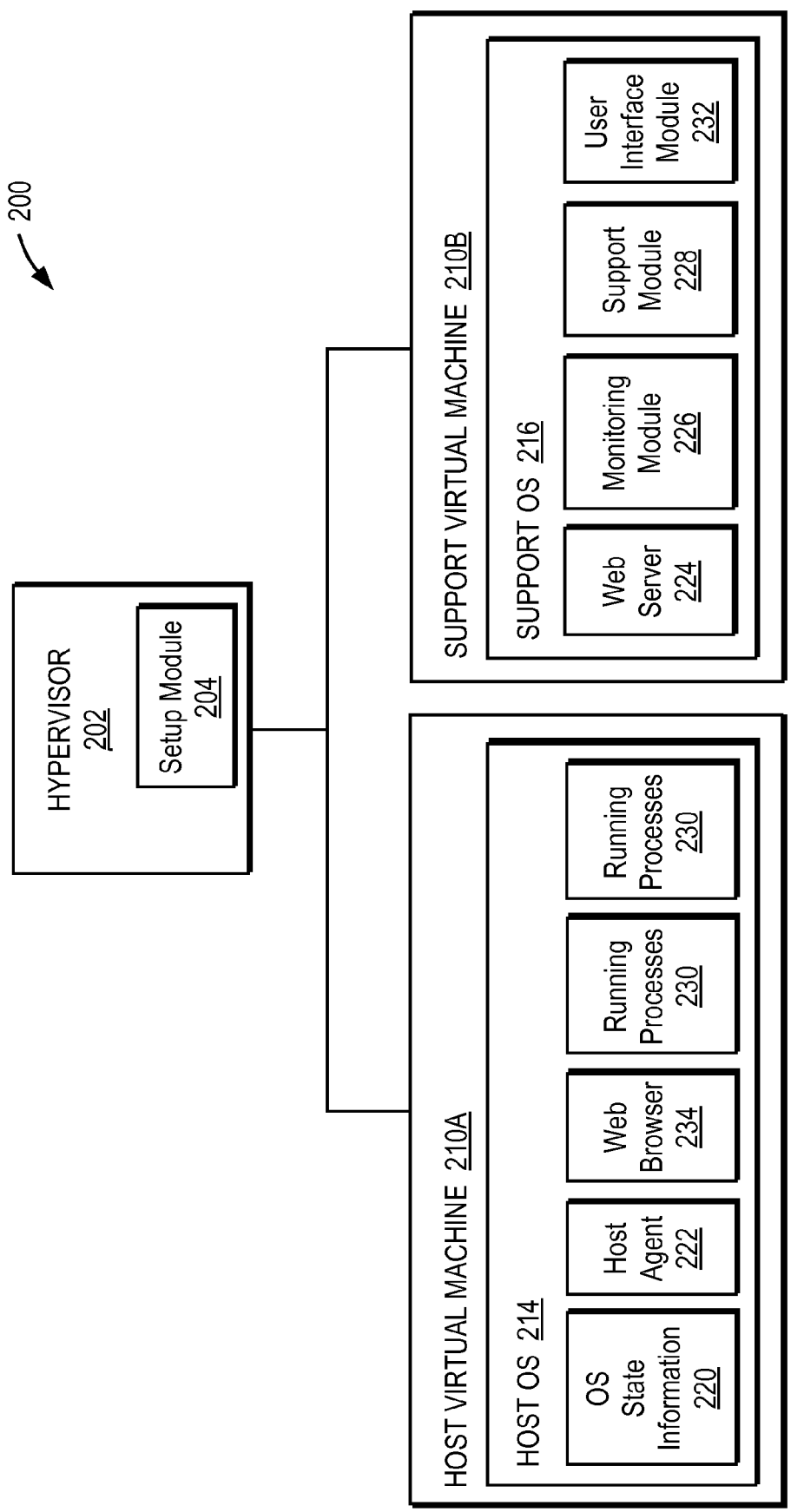
FIG. 2 illustrates a logical view of a computing environment provided by the processor and software according to one embodiment

FIG. 2 illustrates a logical view of a computing environment 200 provided by the processor 102 and software according to one embodiment. The environment 200 includes a hypervisor 202 that supervises the operation of virtual machines 210A and 210B. Other embodiments can have different and/or additional entities. In addition, the functionalities can be distributed among the entities in a different manner than is described above.

The hypervisor 202 is a hardware-assisted virtual machine emulator. The hypervisor 202 runs at a higher privilege level than the virtual machines 210 and is generally capable of creating virtual machines, scheduling their execution, and switching execution from one virtual machine to another or to the hypervisor itself. The hypervisor 202 is supported by virtualization technology in the processor 102, mentioned above. The hypervisor can also configure the I/O virtualization hardware 126 to switch control of the I/O devices between the virtual machines 210 as desired. In one embodiment, the hypervisor 202 may run a setup module 204 that initializes the operation of the virtual machines 210, in this case to provide a failsafe support assistant.

In one embodiment, the setup module 204 starts the virtual machines 210A and 210B, the host OS 214, and the support OS 216. The setup module 204 performs initial checks on the computer 100 before starting the operating systems 214 and 216 to ensure that the computer is in the correct state. The host OS stored image 120 and the support OS stored image 124 can be stored at various locations on the storage device 108, and the setup module 204 can load these operating systems separately in cooperation with the computer's Basic Input/Output System (BIOS). In another embodiment, the computer 100 can support storage device virtualization to load the host OS and support OS. The setup module 204 can also set up the scheduling of the execution of the host OS and support OS.

A virtual machine 210 is a self-contained environment for running software under a hypervisor 202. As a hardware-assisted emulated environment, the virtual machine 210 provides software running on it with a complete address space and a complete set of processor registers. The software contains machine instructions executed by the processor 102. When the hypervisor 202 suspends execution in a virtual machine 210, it preserves the state of the virtual machine, including its memory and registers.

A host OS 214 can run on a host virtual machine 210A. The host OS 214 may be an operating system such as WINDOWS VISTA. The host OS 214 is the primary operating system on computer 100 and performs useful tasks, often through running processes 230. The host OS 214 may interact with a user through the display 118, keyboard 110, and pointing device 114.

The host OS 214 contains state information 220 that describes the running state of the host OS at a given time. The state information 220 includes the operating system kernel, other operating system code and data (such as device drivers and a network protocol stack), and processor registers. Portions of the state information 220 are located in memory 106 and/or the storage device 108. The hypervisor 202 can read and modify the operating system state information 220. Additionally, other virtual machines 210 can read and modify this information by communicating with the hypervisor 202. For example, software in another virtual machine 210B can send a command to the hypervisor 202 to read certain data from the host OS 214, and the hypervisor can read the data and send it to the requesting software in the other virtual machine. By reading and modifying the host OS state information 220, the hypervisor 202 or another virtual machine 210B can monitor and provide support functionality to the host OS 214.

The host OS 214 contains running processes 230 which also possess state information that can be read and modified for support purposes like the OS state information 220 described above. The host OS 214 also contains a host agent 222 and a web browser 234, applications consisting of one or more running processes. The host agent 222 is further described below.

A support OS can also be run on a support virtual machine 210B. The support OS 216 may be an operating system such as WINDOWS CE or LINUX. The support OS 216 is designed to provide support functionality for the optimal operation of host OS 214 and running processes 230. The support OS 216 performs support-related functions through modules such as a web server 224, monitoring module 226, and a support module 228. These modules can be processes, applications or other code running within or using the services of the support OS 216. Since the support OS 216 operates in a separate virtual machine 210B from the host OS 214, it can provide support to the host OS even when the host OS is seriously impaired or unstable.

In one embodiment, the monitoring module 226 monitors the state of the host OS 214. It may do so by periodically examining the OS state information 220 or state information of the running processes 230. The monitoring module 226 can run various diagnostic tests on the host OS 214. If the monitoring module 226 detects a need for support, such as system instability or other defect in the host OS 214, it can call the support module 228. Communication between the monitoring module 226 and the host OS 214 may be facilitated by the hypervisor 202 as described above.

The support module 228 can provide support by remediating a defect in the host OS 214. It does so by analyzing and modifying the OS state information 220 or the state of the running processes 230, for example. In one embodiment, host virtual machine 210A and the host OS 214 are suspended while the support module 228 modifies the state information 220 or the state of the running processes 230. In another embodiment, host virtual machine 210A and the host OS 214 continue to run as the support module makes the modifications. In this case, the support module 228 can make changes to the host OS 214 over time based on the results observed in the host OS. In another embodiment, the support module 228 modifies the host OS stored image 120 on storage device 108. The host OS 214 can then be reloaded from the image with the desired changes made.

The support module 228 can reinstall nonfunctioning applications or even the host OS 214 itself. For example, if the host agent 222 needs to be reinstalled, the support module can trigger the host OS 214 to virtually mount an installation medium (such as a CD-ROM drive) containing the host agent installation image 122. The host OS 214 can then reinstall the host agent 222 from the virtual medium. In some cases, the support module 228 will need to reinstall the host OS 214 itself. This can be done, for example, by copying a standard host OS image over the current host OS stored image 120. The standard host OS image can be stored on storage device 108 or can be obtained from a remote location through the network adapter 116.

The monitoring module 226 and the support module 228 can access an outside network such as the Internet through the network adapter 116. These modules may send data over the network and receive commands from the network. For example, a remote helpdesk can provide support to the computer 100 by communicating over the Internet with the monitoring module 226 and support module 228. In one embodiment, hardware or software may be present in computer 100 to virtualize the network adapter 116 and enable both the host OS 214 and support OS 216 to access the Internet.

In one embodiment, the support OS 216 interacts with the user through the user interface module 232. This module presents a text or graphical interface to the user via the graphics adapter 112, display 118, keyboard 110, and pointing device 114. As described above, I/O virtualization hardware 126 can coordinate access to these I/O devices between the host OS 214 and support OS 216. In one embodiment, support OS 216 has primary control over the I/O devices and the user interface module 232 grants the host OS 214 access to the I/O devices when needed. For example, the user interface module 232 can normally grant I/O access to the host OS 214, but can switch access to the support OS 216 if the host agent 222 fails and is unable to provide a user interface from within the host OS. The user interface module 232 can send commands from the user to the monitoring module 226 and support module 228. The user interface module 232 can also receive data from the monitoring module 226 and support module 228 to be presented to the user.

An alternate user interface can be provided by the web server 224. In this embodiment, the user opens a web browser 234 running in the host OS 214 and connects to the web server 224 using a particular uniform resource locator (URL). The web browser 234 and web server 224 can communicate through the hypervisor 202 as described above. Like the user interface module 232, the web server 224 can provide commands from the user to the support module 228 and can present data from the support module 228 to the user.

The support module 228 can be started based on several possible triggers. If the monitoring module 226 detects a need for support as described above, it can start the support module 228. The support module 228 can also be started based on a user command through the user interface module 232 or the web server 224. In one embodiment, the user can press a particular key combination or press a specially provided support button on the keyboard 110 to cause the support module 228 to run. As mentioned above, I/O virtualization hardware 126 may be present to enable the support OS 216 to receive keyboard input. In one embodiment, the support module 228 is run upon receiving a command remotely through the network adapter 116.

The host agent 222 is an application running in the host OS 214 that can carry out some of the support-related functions of the monitoring module 226, support module 228, and user interface module 232 from within the host OS 214. The host agent 222 can also communicate with these modules in the support OS so that some functions are performed in the host agent 222 while others are performed in the support OS 216. For example, the host agent 222 can perform monitoring, user interface, and some support functions and communicate with the support OS 216 which performs the remaining support functions. Since the host agent 222 is running in the host OS 214, it can conveniently gather dynamic information about the host OS and make changes within the host OS such as starting a new process or changing system settings. Making these changes may be more complex if performed directly by the support OS 216.

Figure 3:
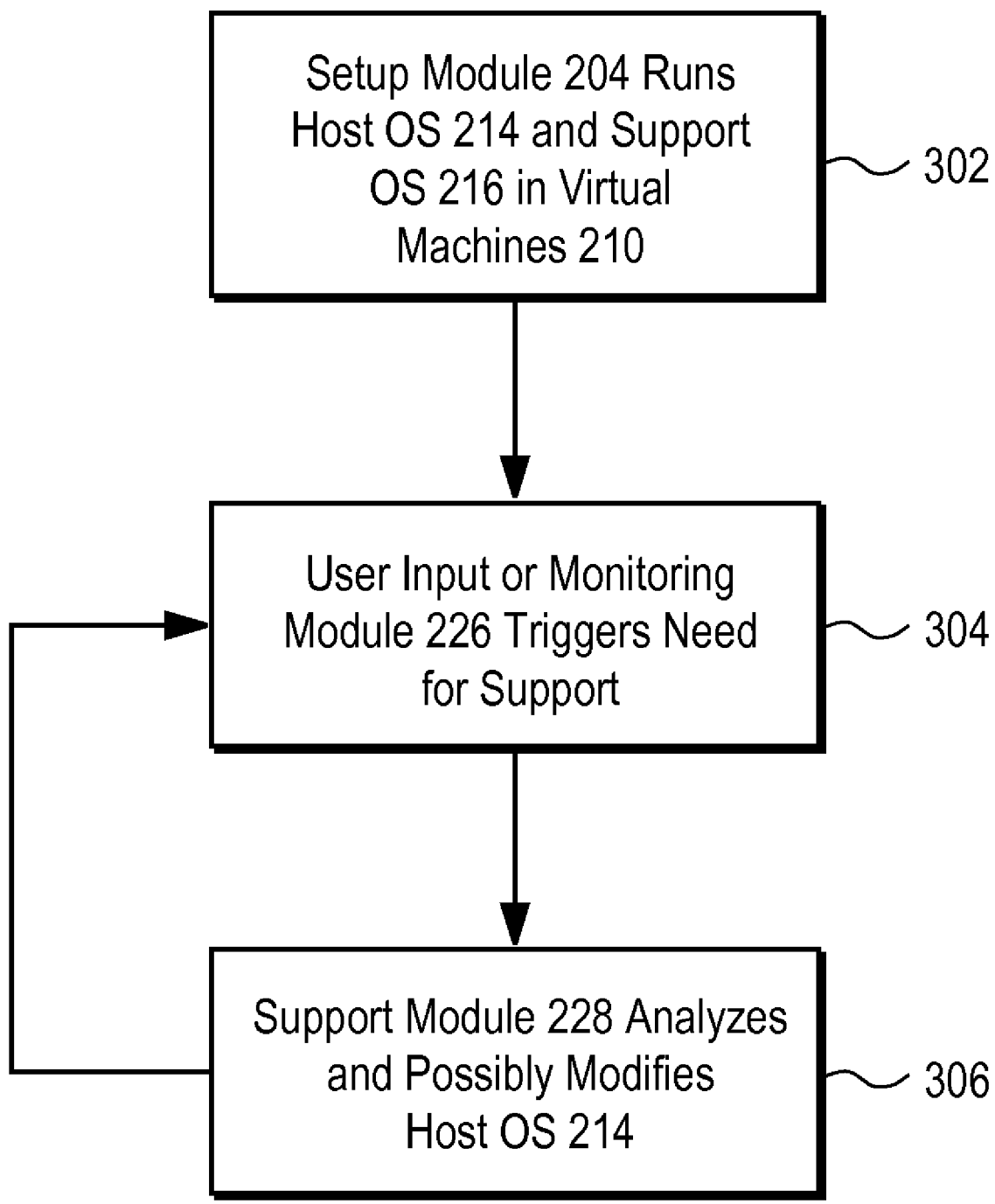
FIG. 3 is a flowchart illustrating the operation of the setup module, monitoring module, and support module, according to one embodiment.

FIG. 3 is a flowchart illustrating the operation of the setup module 204, monitoring module 226, and support module 228, according to one embodiment. The setup module 204 runs 302 the host OS 214 and support OS 216 in virtual machines 210. Once the operating systems are running, user input such as a key press or the monitoring module 226 triggers 304 the need for support. Responsive to this need, the support module 228 analyzes and possibly modifies 306 the host OS 214 including the OS state information 220.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A computer having a processor capable of executing multiple virtual machines, the computer adapted to execute a host operating system in a host virtual machine, the computer comprising:
   a support operating system module for executing in a support virtual machine, the support virtual machine different than the host virtual machine;
   a support module for executing in the support virtual machine under control of the support operating system module for identifying and remediating defects associated with the host operating system in the host virtual machine; and
   a web server module for executing in the support virtual machine under control of the support operating system module for providing a user interface to the support module via a web browser executing in the host virtual machine under control of the host operating system.

2. The computer of claim 1, further comprising:
   a monitoring module for executing in the support virtual machine under control of the support operating system module for monitoring the host operating system to identify a defect associated with the host operating system and for notifying the support module responsive to identification of the defect.

3. The computer of claim 1, further comprising:
   input/output virtualization hardware adapted to virtualize input and/or output devices of the computer to coordinate access to input and/or output data among the host and support virtual machines.

4. The computer of claim 1, further comprising:
   a support button associated with an input device of the computer, wherein activation of the support button activates the support module.

5. The computer of claim 1, further comprising:
   a host agent module for executing in the host virtual machine under control of the host operating system and adapted to interact with the support module to remediate a defect associated with the host operating system.

6. The computer of claim 5, wherein remediating defects further comprises:
   reinstalling the host agent module in the host operating system responsive to failure of the host agent module.

7. The computer of claim 1, wherein the support operating system module is adapted to control access to the input and/or output devices of the computer by the host operating system.

8. The computer of claim 1, wherein remediating defects further comprises:

modifying state information of the host operating system running on the host virtual machine.

9. A computer-implemented method of supporting a host operating system in a host virtual machine on a computer having a processor capable of executing multiple virtual machines, the method comprising:
- executing a support operating system in a support virtual machine, the support virtual machine different than the host virtual machine;
- identifying and remediating defects associated with the host operating system in the host virtual machine, the identifying and remediating performed at least in part from the support operating system in the support virtual machine; and
- executing a web server in the support virtual machine under control of the support operating system for providing a user interface via a web browser executing in the host virtual machine under control of the host operating system.

10. The computer-implemented method of claim 9, further comprising:
- monitoring the host operating system to identify a defect associated with the host operating system, the monitoring performed at least in part from the support operating system in the support virtual machine.

11. The computer-implemented method of claim 9, further comprising:
- virtualizing input and/or output devices of the computer to coordinate access to input and/or output data among the host and support virtual machines.

12. The computer-implemented method of claim 9, wherein identifying and remediating defects associated with the host operating system is activated when a support button associated with an input device of the computer is pressed.

13. The computer-implemented method of claim 9, wherein a host agent executes in the host operating system, and wherein identifying and remediating defects associated with the host operating system further comprises:
interacting with the host agent from the support operating system.

14. A computer program product having a computer-readable medium having computer program instructions recorded thereon for executing on a processor, the computer program instructions configured for providing support to a host operating system in a host virtual machine executing on the processor, comprising:
- a support operating system module for executing in a support virtual machine, the support virtual machine different than the host virtual machine;
- a support module for executing in the support virtual machine under control of the support operating system module for identifying and remediating defects associated with the host operating system in the host virtual machine; and
- a web server module for executing in the support virtual machine under control of the support operating system module for providing a user interface to the support module via a web browser executing in the host virtual machine under control of the host operating system.

15. The computer program product of claim 14, further comprising:
- a monitoring module for executing in the support virtual machine under control of the support operating system module for monitoring the host operating system to identify a defect associated with the host operating system and for notifying the support module responsive to identification of the defect.

16. The computer program product of claim 14, further comprising:
- a host agent module for executing in the host virtual machine under control of the host operating system and adapted to interact with the support module to remediate a defect associated with the host operating system.

* * * * *

UNITED STATES PATENT AND TRADEMARK OFFICE
CERTIFICATE OF CORRECTION

PATENT NO. : 7,685,474 B2 Page 1 of 1
APPLICATION NO. : 11/687424
DATED : March 23, 2010
INVENTOR(S) : Pieter Viljoen It is certified that error appears in the above-identified patent and that said Letters Patent is hereby corrected as shown below:

Column 8, line 5, Claim 14, after "thereon" insert --for executing on a computer, the computer program instructions configured--.

Signed and Sealed this

Sixth Day of July, 2010

David J. Kappos
*Director of the United States Patent and Trademark Office*